United States Patent [19]

Johnston

[11] Patent Number: 5,427,387

[45] Date of Patent: * Jun. 27, 1995

[54] RADIAL SHAFT SEALING RING

[75] Inventor: David E. Johnston, Weinheim, Germany

[73] Assignee: Firma Carl Freudenberg, Weinheim, Germany

[ * ] Notice: The portion of the term of this patent subsequent to Mar. 2, 2010 has been disclaimed.

[21] Appl. No.: 6,020

[22] Filed: Jan. 15, 1993

[30] Foreign Application Priority Data

Jan. 16, 1992 [DE] Germany .......................... 42 00 927.8

[51] Int. Cl.$^6$ ............................................. F16J 15/32
[52] U.S. Cl. ...................................... 277/152; 277/134
[58] Field of Search ................. 277/152, 153, 134, 37, 277/67, 68

[56] References Cited

U.S. PATENT DOCUMENTS

| | | | |
|---|---|---|---|
| 4,283,064 | 8/1981 | Staab et al. | 277/152 |
| 4,427,205 | 1/1984 | Holzer et al. | 277/134 |
| 4,440,405 | 4/1984 | Schaus | 277/134 |
| 5,190,299 | 3/1993 | Johnston | 277/152 |

*Primary Examiner*—William A. Cuchlinski, Jr.
*Assistant Examiner*—Daniel G. DePumpo
*Attorney, Agent, or Firm*—Kenyon & Kenyon

[57] ABSTRACT

A radial shaft sealing ring having a sealing axis and a sealing lip of polymer material is disclosed. The ring contacts the circumference of a shaft against which a seal is formed via a sealing lip halving ribs that are evenly distributed in the circumferential direction and which project radially inward. The sealing lip is delimited on the inside by a hollow-conical inner surface, which is widened in diameter in the direction of the side facing away from the sealed space. On the side of the sealing lip facing away from the space to be sealed, the inner surface forms a first angle with the sealing axis, which is 0.02 to 0.5 times as great as a second angle formed by this inner surface on the side of the sealing lip facing the sealed space and by the sealing axis. The ribs are formed as a corrugation of the inner surface which continues only in the circumferential direction along a circular circumferential line.

12 Claims, 3 Drawing Sheets

RADIAL SHAFT SEALING RING

BACKGROUND OF THE INVENTION

The invention relates generally to a polymeric radial shaft sealing ring and, more particularly, to one of the type having a sealing axis and a sealing lip that contacts the periphery of a shaft with respect to which it provides a seal; the sealing lip is further provided with ribs that are evenly distributed in the circumferential direction and which project radially inwardly.

This general type of radial shaft sealing ring is disclosed by the German Patent 28 35 359, which corresponds to U.S. Pat. No. 4,283,064 (the contents of which are herein incorporated by reference). The reference discloses a radial shaft sealing ring for hydrodynamic shaft seals that has ribs which project radially towards the inside only when the sealing ring is in a relaxed state. During normal operational use, when the ring-shaped sealing element is in contact with and provides a complete seal with respect to the periphery of the shaft being sealed, the annular-discoid shape, together with the ribs projecting radially inward, is lost, and the sealing element forms a sealing lip that is conically inclined towards the inside relative to the shaft axis. Viewed in the circumferential direction, this sealing lip is sinusoidally displaced in the axial direction relative to a circular circumferential line. This waviness in the axial direction produces a recirculating effect for the medium to be sealed in the direction of the sealed space. This is caused by the axial deflection of the fluid components between the shaft surface and the sealing lid of the sealing element. However, during normal operational use of this annular sealing element, the position of the sealing lip relative to the shaft surface can experience changes over its service life, due to relaxation of the polymer. In some instances, this can adversely affect the sealing action. However, since the recirculating effect is based on an axial deflection of the fluid components on the shaft, it is necessary to have an unvarying geometric shape and a constant geometric relationship between the seal and shaft over their service life. The working properties of this device are not very satisfactory where long service life is desired, particularly in the case of a stationary shaft where a static sealing action is required.

There remains a need for the further development of a radial shaft sealing ring of this type that exhibits excellent operating properties across a long service life with improved sealing and reduced leakage, both when the shaft is at rest and when the shaft is in rotation.

SUMMARY OF THE INVENTION

This objective is solved according to the invention by providing a sealing lip having circumferentially arrayed undulations that project radially—not axially—when in use about a shaft.

In the radial shaft sealing ring of the invention, the sealing lip is delimited on the inside by a hollow-conical inner surface, which is widened in diameter in the direction of the side facing away from the sealed space containing fluid. On the side of the sealing lip facing away from the sealed space, the inner surface of the sealing lip forms a first angle with respect to the sealing axis that is 0.02 to 0.5 times as great as a second angle defined with respect to the sealing axis of the inner surface of the sealing lip on the side of the sealing lid facing the sealed space. The ribs are formed by a corrugation or waviness of the inner surface of the sealing member occurring in only the circumferential direction along a circular circumferential line. The result of this refinement is that, with its radial, inwardly pointing ribs, the wavelike corrugation, which extends only in the circumferential direction along a circular circumferential line, sealingly contacts the shaft to be sealed with variable prestressing. These ribs, which have a minimal clearance from the sealing axis, abut the shaft with a pre-stress greater than that provided by those ribs having a larger clearance from the sealing axis. Within the scope of the present invention, the sealing lip contacts the shaft along all portions of a circumferential peripheral section. A further embodiment utilizes a refinement in which the sealing lip touches the shaft in most, though not all, portions of its periphery. At those portions where the sealing lip does not contact the shaft, there is a defined gap with respect to the shaft that is narrow enough to exhibit capillary activity.

In contrast to other seals, the pump action of the fluid medium being sealed in the direction of the sealed space is not based on the use of a radial shaft sealing ring having projections running sinusoidally in an axial direction. Rather, the operation of this device is based on the action of a swelling force, acting in a radial direction on the fluid to be sealed during the dynamic sealing action. The inventive refinement of the inner surface of the radial shaft sealing ring causes the fluid components, which form a hydrodynamic lubricant film, to be pressed in the direction of the space to be sealed.

The inventive improvement of the radial shaft sealing ring also provides an excellent degree of lubrication between the sealing lip and the adjacent shaft. Consequently, the sealing lip is subjected to aa the exceptionally low wear during use and attains a very long service life, while providing excellent sealing results, independently of the direction of the shaft's rotation. A further advantage is that not only can fluid-filled spaces be sealed off from the environment by the radial shaft sealing ring, but the pump action of the radial shaft sealing ring conveys fluid located outside the space sealed past the sealing lip back into the sealed space where it is held after the pumping or conveying process is complete. The wavy corrugation of the inner surface, which occurs exclusively in the circumferential direction and only along a circular circumferential line both causes the medium to be sealed, and further provides a hydrodynamic lubricant film between the sealing lip and the shaft. This fluid is first entrained by and moves with the shaft, and is then transported back in the direction of the sealed space.

The sealing lip of the sealing ring is delimited on the inside by a sealing surface, which has a hollow-conical shape and which is widened in diameter on the side facing away from the space to be sealed. Where it is necessary to provide a static sealing action, no relative movement occurs between the shaft being sealed and the radial shaft sealing ring. In this case, the sealing lip sealingly abuts the shaft all along its circumference. Here again, the sealing lip contacts the shaft only along a circular circumferential line, and does not exhibit any corrugation in the axial direction. The ribs of the inner surface, which are corrugated in only the radial direction, cause a relatively smaller force to be exerted on the shaft surface in the regions having the largest clearances from the sealing axis than in those regions having smaller clearances. In the case of a static sealing action, the line of contact between the sealing lip and the shaft is closed upon itself, making it possible reliably to prevent leakage in this operating state. The refinement of the form of the radial shaft sealing ring, particularly with respect to the geometry of its inner surface, is of significance for providing a dynamic sealing action during shaft rotation. In addition to the wave-radial corrugation of the inner surface, the provision of surfaces whose angular orientation with respect to the sealing axis is such that the angle defined by the inner surface at the side of the lip facing the sealed area is greater than the angle defined at the side facing away from that sealed space. These features collectively produce a pumping effect that returns the fluid medium being sealed to the direction of the space in which it is intended that it be kept.

By using ribs which are corrugated only in the radial direction and providing the aforementioned geometry of the sealing lip, a swelling radial force acts in the direction of the shaft surface; fluid components contained in the region of action of the inside surface are displaced in both axial directions, during rotation of the shaft. After the radial force subsides, the fluid components move in the direction of the sealing lip. The different angles of the inner surface that forms the sealing lip combine to produce a pumping effect upon the medium being sealed in the direction of the space to be sealed. By avoiding axial projections or other baffles that have been hitherto used to pump the fluid back in the direction of the sealed space, the radial shaft sealing ring can perform its function independently of the direction of rotation of the shaft and/or of the radial shaft sealing ring.

The inner surface can be made up of conical surfaces of imaginary cones, which follow one another in the circumferential direction and which have a conical axis that lies, alternately, radially inside and radially outside the sealing lip. The uniform curvature of the conical surfaces results in a uniform discharge effect for the sealed medium, and further directs it back into the sealed space. Moreover, it is a further advantage that such uniformly designed conical surfaces are easy and economical to produce.

In the circumferential direction, it is possible for the inner surfaces to have a sinusoidal corrugation, extending only in the radial direction. Due to the different gradients along the sine curve, which extends along a circular circumferential line, discharge effects of varying strength occur in various regions of the sealing lip. The form of the sinusoidal inner surface enables the radial shaft sealing ring to adapt quite well to use with fluids of differing viscosities.

The type and characteristic values of the material used for the radial shaft sealing ring material affect the operation of the sealing arrangement. One advantageous refinement provides for the difference between the largest and smallest distances between the sealing lip and the sealing axis, which are adjacent to one another in the circumferential direction, to be less than 0.3 mm. If this distance differential of 0.3 mm is exceeded, in most cases, the fluid entrainment effect will no longer be as certain, due to the rotation of the shaft and the radial shaft sealing ring relative to one another.

The difference between the largest and smallest distances between the sealing lip and the sealing axis, which are adjacent to one another in the circumferential direction, can be less than 0.15 mm, and is preferably less than 0.1 mm. The smaller the difference in the distances between the corrugated inner surface and the sealing axis, the more reliably the fluid components are entrained, even at low circumferential shaft speeds.

The sealing effect also increases as the differences between the distances decrease, so that differences smaller than 0.1 mm are preferred when low-viscosity media are sealed. On the other hand, large differences in the range of between 0.1 and 0.3 mm are more economical to produce and are better suited for sealing relatively viscous media.

The inner surface of the radial shaft sealing ring, whose adjacent apex points are a circumferentially spaced apart a distance of at least 1.5 mm, makes possible the provision of good working properties across a long service life and further renders possible a design that is economical to produce. The magnitude of the circumferential spacing is essentially dependent on the diameter of the shaft to be sealed, its rotational speed, and on the viscosity of the medium to be sealed.

The inner surfaces of radial shaft sealing rings used to seal larger diameter shafts may be provided with circumferential peak-to-peak spacing of at least 5 mm between corresponding adjacent points along the corrugation. At least two full corrugations should be arranged along the inner surface independently of the circumferential spacing between the adjacent apex points. As the size of the circumferential spacing increases for a given shaft size, the angles formed by the inner surface of the corrugation and the adjacent shaft surface in the circumferential direction become smaller. This results in a better dynamic sealing action and a higher delivery pressure on the medium being sealed as it is returned back into the space being sealed.

The inner surface on the side of the sealing lip that faces away from the sealed space can have an axial length of at least 1 mm. This is advantageous for both good static sealing action, as well as the provision of a good dynamic seal. In the case of a dynamic sealing action, the axial length, combined with the slight, radial gap width between the inner surface and the shaft, forms a sealing gap narrow enough to produce capillary activity. As a result, the fluid making up the hydrodynamic lubricant film is reliably held in the region of the inner surface of the radial shaft sealing ring.

On the side of the sealing lip that faces away from the sealed space, the inner surface forms an angle of between 2° and 20° with respect to the sealing axis. This range is well suited for a large number of applications. A preferred range for this angle is between 3.123 and 3.875° with respect to the sealing axis.

In a further embodiment, the inner surface can be delimited on both sides of the corrugation in the axial direction by end faces which extend perpendicularly to the sealing axis. In accordance with this embodiment, one can achieve a more precisely defined stressing of the inner surface of the shaft in the radial direction. Moreover, this structural arrangement is simpler to manufacture.

BRIEF DESCRIPTION OF THE DRAWINGS

FIG. 4 shows the sealing lip viewed along Section A—A of FIG. 3, while FIG. 5 shows the sealing lip viewed along Section B—B.

DETAILED DESCRIPTION OF THE DRAWINGS

Figure 1:
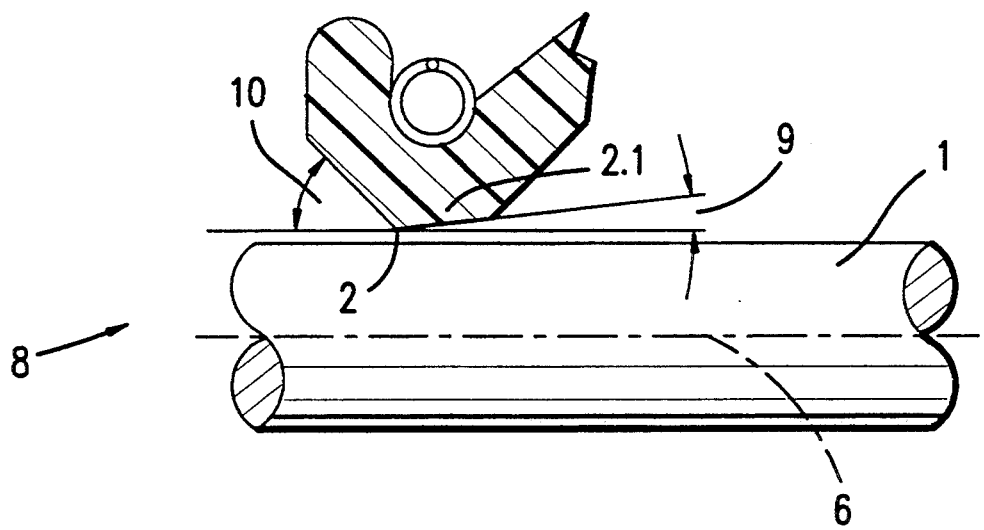
FIG. 1 provides a cross-sectional view of a radial shaft sealing ring constructed according to a first embodiment of the invention, taken along Section A—A in FIG. 3.

FIG. 1 depicts a portion of a radial shaft sealing ring and shaft having a sealing axis 6. With a sealing lip 2 of polymeric material, this part abuts on and sealingly contacts the periphery of the shaft 1. To provide a better understanding of the operative principle underlying the radial shaft sealing ring of the invention, it is shown with a slight radial gap relative to the shaft 1 in FIG. 1.

The sealing lip 2 is comprised of a multi-faced inner surface 2.1. On the side of the sealing lip 2 that faces away from the sealed space 8, the inner surface 2.1 forms a first angle 9 with respect to the sealing axis 6. This first angle is approximately 0.15 times as great as the second angle 10 formed by the inner surface 2.1 with respect to the sealing axis 6 on the side of the sealing lip 2 that faces the sealed space 8. In this embodiment, the first angle 9 is approximately 6.5°; the second angle 10 is approximately 45°. The first angle 9, which is significantly more acute than the second angle 10, produces a discharge effect for the medium entrained by the rotating shaft in the direction of the space 8 being sealed. The inner surface 2.1 is corrugated in a sine shape in only the circumferential direction, i.e. along a circular circumferential line. As a result, when the shaft rotates with respect to the seal, a pulsating force is exerted in the radial direction on the fluid film between the shaft 1 and the radial shaft sealing ring. Due to the radial corrugation and the V-shaped structure of the inner surface 2.1, this radial force alternately causes the fluid components to be displaced in both axial directions, and subsequently, as the force diminishes, causes the fluid components to move in the direction of the sealing lip 2. The overall effect of the geometric shape of the inner surface 2.1 is to produce a pumping effect in the direction of the sealed space 8.

Figure 2:
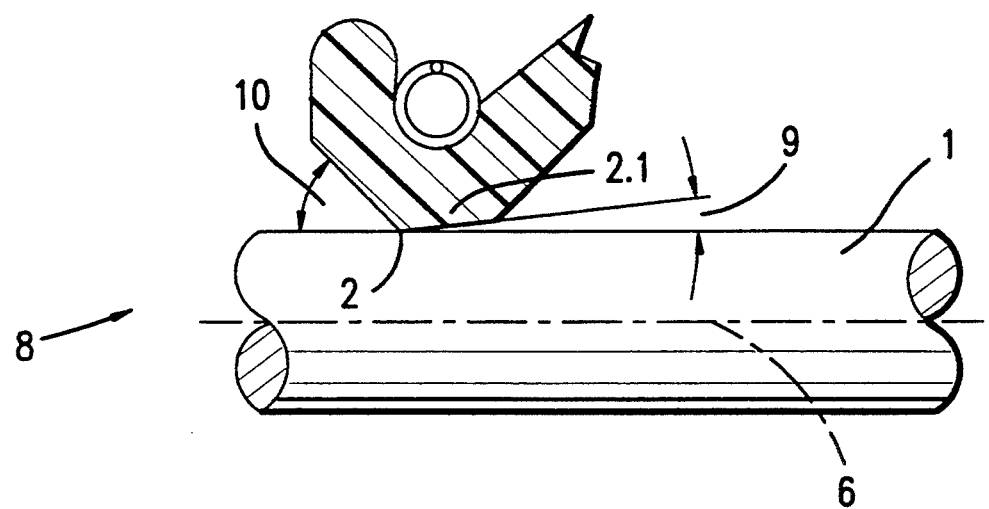
FIG. 2 illustrates the sealing lip of the radial shaft sealing ring according to the invention along Section B—B of FIG. 3.

FIG. 2 depicts the radial shaft sealing ring according to the invention. It touches upon the surface of the shaft 1 with greater radial pre-stressing than in FIG. 1. This Figure shows the portion of the sealing ring having the smallest distance 5 between the inner surface 2.1 and the sealing axis 6. In spite of the fact that, compared to FIG. 1, the pre-stressing under which the sealing lip 2 touches upon the surface of the shaft 1 is relatively greater, the geometric shape of the inner surface 2.1 is retained to the greatest possible extent. There is no axial displacement of the sealing lip 2 on the surface of the shaft 1, so that the contact between the sealing lip and the shaft 1 lies along a circular circumferential line, both in the case of a static sealing action as well as a dynamic sealing action. The advantageous working properties of the radial shaft seal according to the invention are independent of the direction of rotation of the shaft 1.

Figure 3:
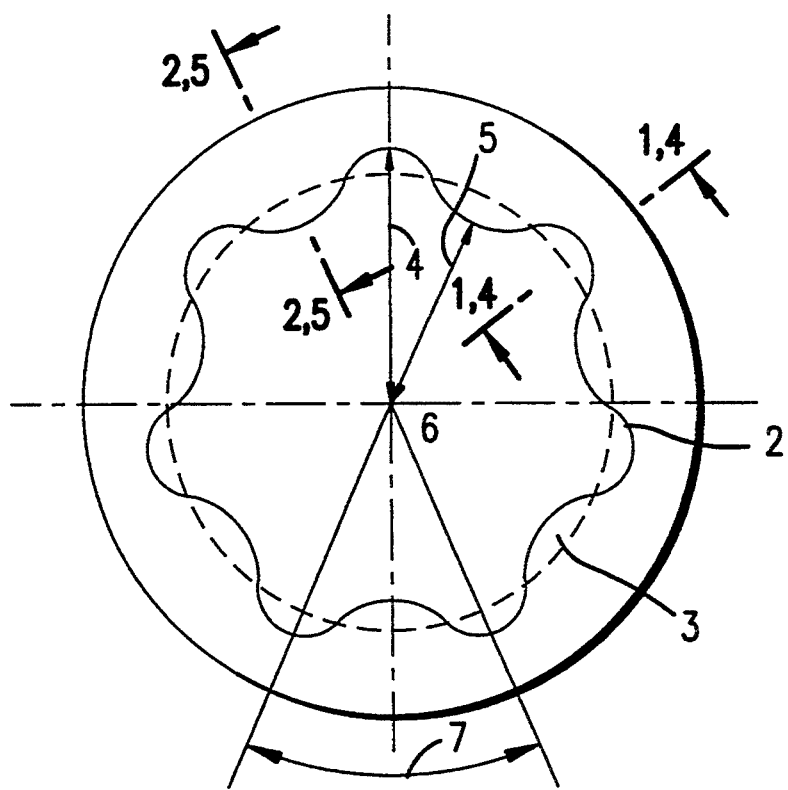
FIG. 3 provides a top plan view of the radial shaft sealing ring.

FIG. 3 shows one view of the radial shaft sealing ring according to FIGS. 1 and 2. To clarify the method of operation, the largest distances 4 and the smallest distances 5 between the inner surfaces 2.1 and the sealing axis 6 are shown greatly enlarged. The inner surface 2.1 is corrugated sinusoidally in the circumferential direction, so that the corrugation projects inwardly only in the radial direction, along a circular circumferential line. The circumferential distance between corresponding adjacent apex points of the corrugation is denoted by the reference number 7. Regardless of the size of the radial shaft sealing ring, at least two complete corrugations, each having a circumferential extent 7, are required along the inner circumference of the radial shaft sealing ring.

Figure 4:
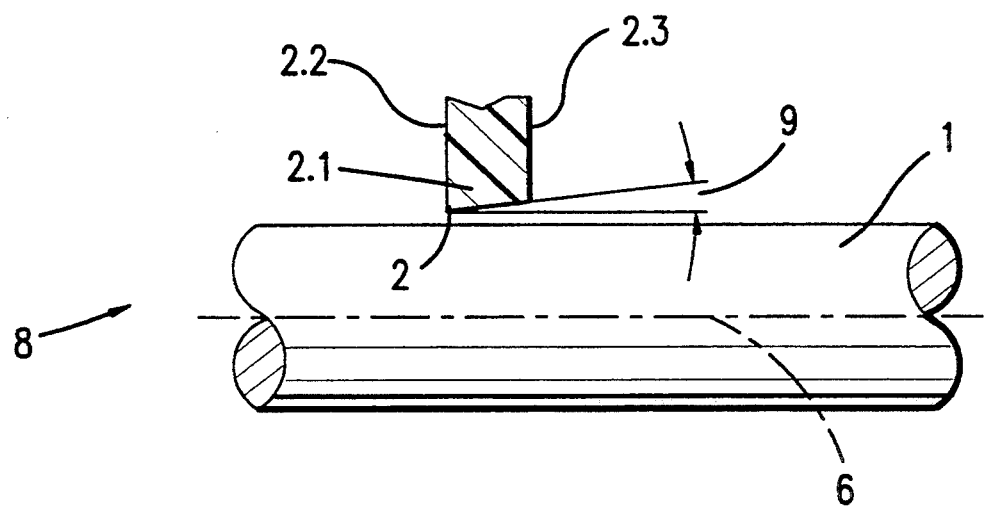
FIGS. 4 and 5 illustrate a second embodiment of the sealing lip of a radial shaft sealing ring, in which the inner surfaces are delimited in the axial direction on both sides by end faces which extend perpendicularly to the sealing axis.
Figure 5:
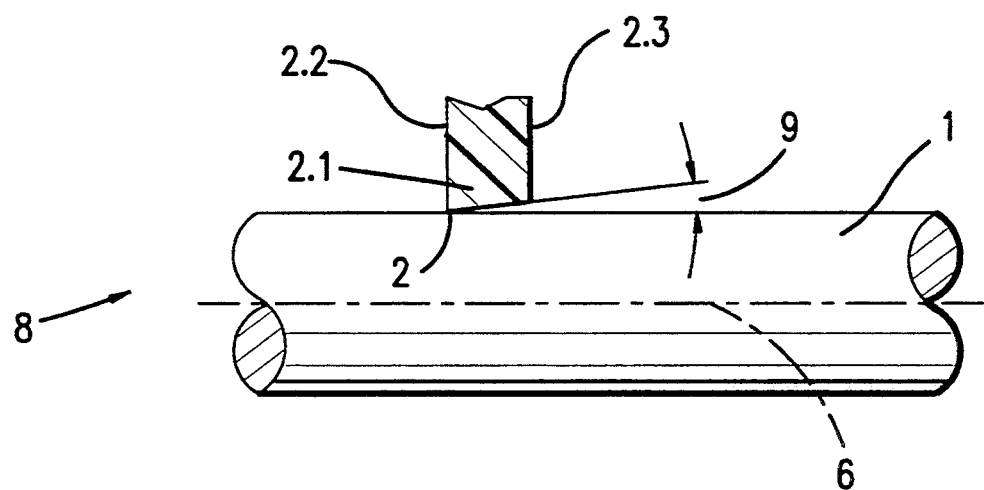

In FIGS. 4 and 5, the inner surface 2.1, which is inclined at an angle with respect to the sealing axis 6, is delimited in the axial direction on both sides by end faces 2.2, 2.3, which extend perpendicularly to the sealing axis 6.

FIG. 5 shows the radial shaft sealing ring of FIG. 4, whereby the inner surface exhibits the smallest possible distance 5 from the sealing axis 6a (corresponding to Section B—B of FIG. 3). The inner surface 2.1 has an axial length of at least 1 mm, in the case of the refinement according to FIGS. 4 and 5, as well. This embodiment operates essentially according to the principles set forth above with respect to the first embodiment.

What is claimed is:

1. A radial shaft sealing ring for a shaft having a longitudinal sealing axis, the sealing ring comprising a polymeric sealing lip having:
   a first side that faces away from a sealed space that is to contain a sealed fluid and a second side that faces the sealed space;
   an inner surface that includes a first conical inner surface that flares outwardly from the shaft at the first side of the sealing ring and a second conical inner surface that flares outwardly from the shaft at the second side of the sealing ring that faces the sealed space, wherein both the first conical inner surface and the second conical inner surface define first and second angles respectively with respect to the longitudinal axis of the shaft, and the first angle is 0.02 to 0.5 times as great as the second angle; and
   a series of circumferential, evenly spaced inwardly directed ribs that form a wave-like corrugation of the inner surface of the sealing lip, said corrugation lying along a plane orthogonal to the longitudinal sealing axis.

2. The radial shaft sealing ring according to claim 1, wherein the amplitude of the wave-like corrugations in the radial direction is less than 0.3 mm prior to fitting the sealing ring over the shaft.

3. The radial shaft sealing ring according to claim 1, wherein the conical inner surface facing the sealed area is made up of conical surfaces of imaginary cones, which follow one another in the circumferential direction and which have a conical axis that lies, alternately, radially inside and radially outside the sealing lip.

4. The radial shaft sealing ring according to claim 1, wherein in the circumferential direction, the corrugation of the inner surface is sinusoidal, and extend only in the radial direction.

5. The radial shaft sealing ring according to claim 1, wherein the difference between the largest and smallest distances between the sealing lip and the sealing axis is less than 0.15 mm.

6. The radial shaft sealing ring according to claim 1, wherein the difference between the largest and smallest distances between the sealing lip and the sealing axis is less than 0.1 mm.

7. The radial shaft sealing ring according to claim 1, wherein the wavelength of the circumferential corrugation with respect to adjacent points situated at a maximum distance from the center of the sealing ring is at least 1.5 mm.

8. The radial shaft sealing ring according to claim 1, wherein the wavelength of the circumferential corrugation with respect to adjacent points situated at a maximum distance from the center of the sealing ring is at least 5 mm.

9. The radial shaft sealing ring according to claim 1, wherein the inner surface on the side of the sealing lip facing away from the space to be sealed has an axial length of at least 1 mm.

10. The radial shaft sealing ring according to claim 1, wherein the inner surface of the sealing ring is delimited in the axial direction by end faces which extend perpendicularly to the sealing axis.

11. The radial shaft sealing ring according to claim 1, wherein on the side of the sealing lip facing away from the sealed space, the inner surface forms an angle of between 2° and 20° with respect to the sealing axis.

12. The radial shaft sealing ring according to claim 11, wherein the angle is between 3.123 and 3.875°.

* * * * *